April 9, 1968

R. O. HUTCHINSON 3,376,982

CONVEYOR SYSTEM WITH CODED OPERATIONAL ELEMENTS

Filed Sept. 8, 1965

INVENTOR.
ROBERT O. HUTCHINSON
BY Townsend and Townsend
ATTORNEYS

April 9, 1968 R. O. HUTCHINSON 3,376,982
CONVEYOR SYSTEM WITH CODED OPERATIONAL ELEMENTS
Filed Sept. 8, 1965 4 Sheets-Sheet 2

INVENTOR.
ROBERT O. HUTCHINSON
BY
Townsend and Townsend
ATTORNEYS

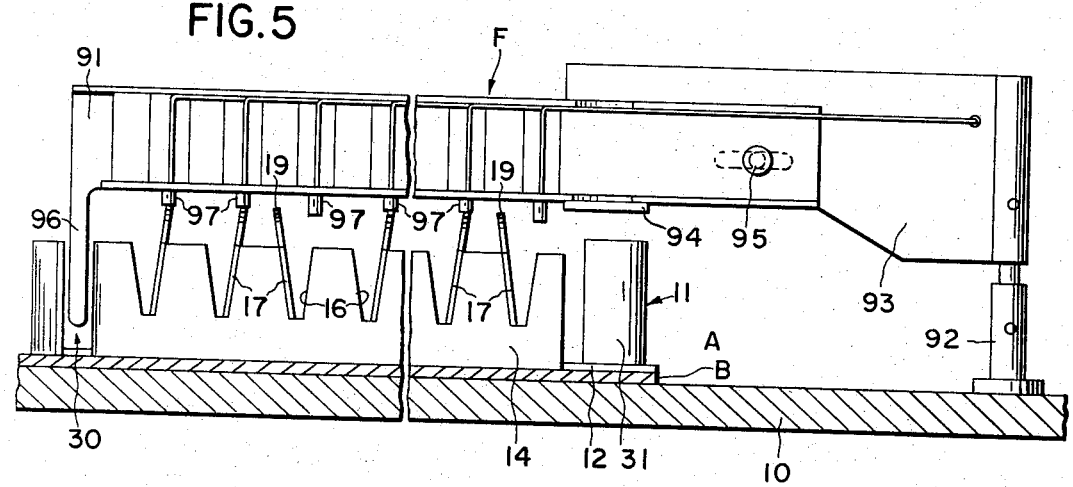
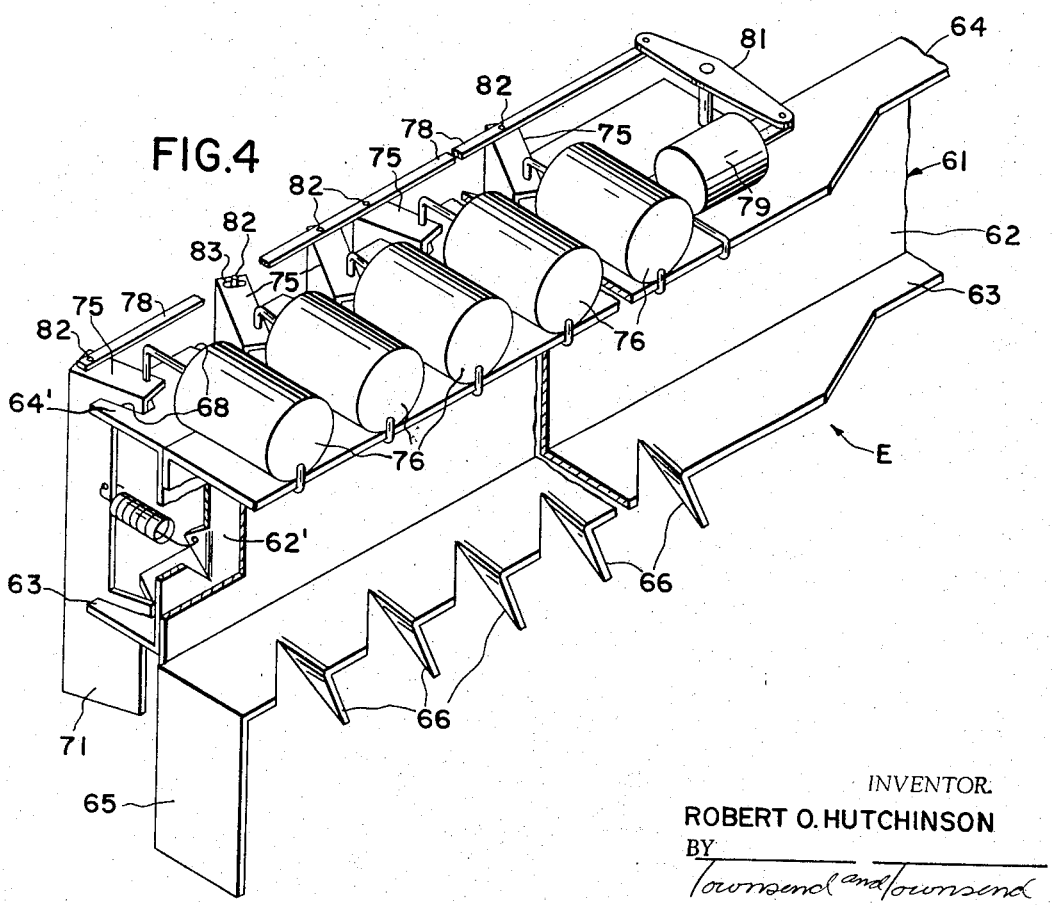

April 9, 1968 R. O. HUTCHINSON 3,376,982
CONVEYOR SYSTEM WITH CODED OPERATIONAL ELEMENTS
Filed Sept. 8, 1965 4 Sheets-Sheet 4
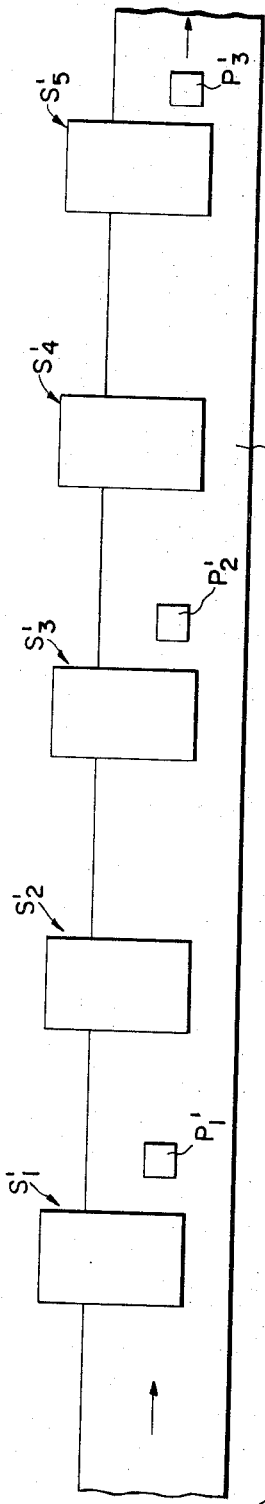
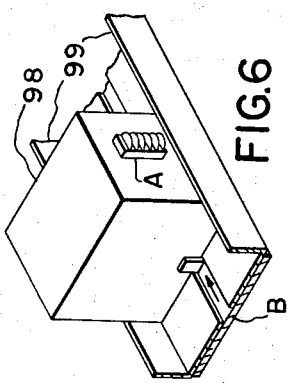
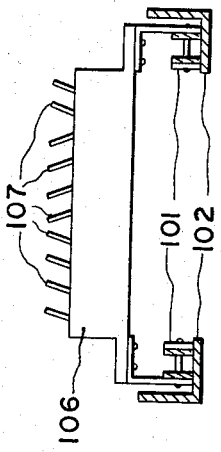
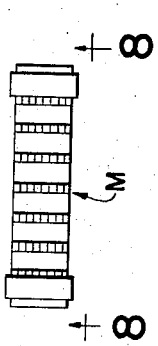
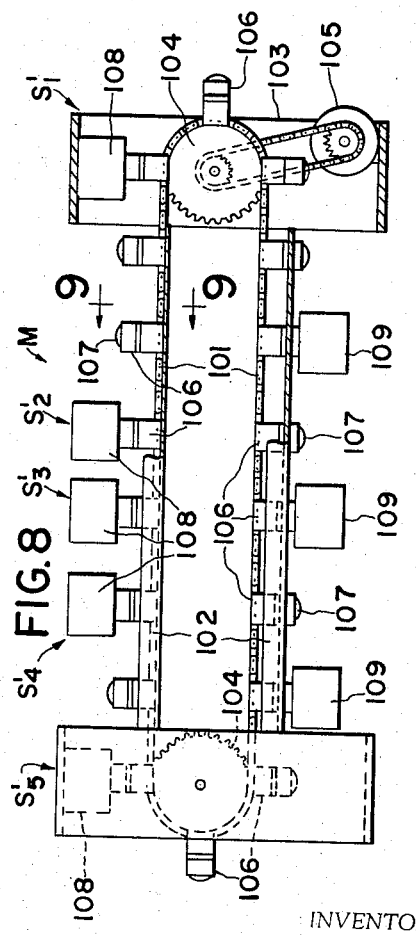
INVENTOR.
ROBERT O. HUTCHINSON
BY Townsend and Townsend
ATTORNEYS

United States Patent Office 3,376,982
Patented Apr. 9, 1968

3,376,982
CONVEYOR SYSTEM WITH CODED
OPERATIONAL ELEMENTS
Robert O. Hutchinson, 959 Rich Ave.,
Mountain View, Calif. 94040
Filed Sept. 8, 1965, Ser. No. 485,885
5 Claims. (Cl. 214—11)

ABSTRACT OF THE DISCLOSURE

A conveyor assembly is disclosed having coded information impressed upon the conveyor in the form of vanes each movable between a plurality of positions with each position serving as a bit of information and writing assemblies in the form of shaped channel members and reading and actuating members in the form of vane riders for avoiding engagement between a conveyor actuating plate and the actuated member except where the coded position of the vanes correspond to the coded position of the riders.

---

The present invention is directed in general to a conveying method and apparatus and more particularly, to a method and apparatus wherein coded information for performing certain functions with respect to a conveyor assembly is transported along the conveyor.

Broadly stated, the present invention, to be described in greater detail below, is directed to a conveyor method and apparatus wherein an actuating member either performing a job associated with the conveyor assembly or maintaining information associated with the conveyor assembly is carried on the conveyor and coded information is impressed upon this member for performing the job functions or maintaining the desired coded information along the length of the conveyor.

Until the present time conveying assemblies have performed a great deal of functions for the modernization and mechanization of job handling capabilities. Such assemblies used along an assembly line where job functions are performed on articles carried by the conveyor or merely for the transport of goods along the conveyor from one location to another have greatly reduced the time and manpower needed to accomplish the job with which the conveying assembly has been associated. One of the major problems involved with the operation and utilization of conveyors is the performance of routine job functions along the length of the conveyor easily and efficiently. One proposal for automatically handling these job functions along the length of a conveyor assembly has been to provide a magnetic tape moving with the conveyor and a tape recorder associated with the conveying assembly for recording on the tape bits of information as to the functions to be accomplished at different locations along the conveying assembly. This system requires a tape reader at each of the job function producing stations along the length of the conveyor to read this recorded information and initiate the performance of the functions. Naturally, such a system requires costly magnetic tape readout equipment at each of the job performing stations along the length of the conveyor.

The present invention avoids the necessity for costly electronic equipment to readout the recorded information along the length of the conveyor and at the same time permits utilization of the power of the conveying member for accomplishing the job functions at the many locations along the conveying path. Therefore, in accordance with one aspect of the present invention the actuating member provided with coded information on the job performing tasks is transported on the conveying member and serves to drive actuated members spaced along the length of the conveyor.

Thus, in accordance with the present invention, the actuating member is provided with means, such as, for example, vanes, each movable between a plurality of positions with each position constituting a coded bit of information which can be impressed upon the actuating member by writing apparatus located at one end of the path to be traveled by articles to be conveyed. These actuating members as they move along the travel path encounter actuated members associated with job functions at stages along the travel path. Each of the actuated members is provided with a coded designation. If the designation of the actuated member is written on or impressed upon the actuating member at the writing station, the actuating member engages the actuated member upon passing thereby and the motion of the actuating member moves the actuated member to accomplish a desired function. If on the other hand, the actuating member does not contain the coded information of the actuated member, the actuated member simply rides over the actuating member as it passes thereby so that no job operation is performed at that location.

It will be seen that the movement of the conveyor itself provides the force for accomplishing the desired job functions at specific locations along the travel path of the conveyor and therefore no auxiliary power is required at the remote stations along the conveyor path.

In accordance with another aspect of the present invention, specific structure is provided for accomplishing the broad aspects of the present invention and wherein the structure is adapted for utilizing a minimum number of different parts on the various separate structural assemblies of the operating system. Thus, the actuating member is made up of a main body channel member provided with a guiding channel at one end for properly locating the writing assembly, the actuated assembly, and the reading assembly and a plurality of movable vanes or fingers movably supported for positioning in a plurality of different positions. These vanes, spring supported, can be moved between the various positions each of which indicates a coded bit of information. By way of example, each vane can have two positions whereby a binary coded system can be produced.

The writing assembly includes a similarly shaped channel member provided with a set of reset tabs projecting from one surface thereof for resetting all of the vanes of the actuating members to one position, and a set of writer vanes movable to desired coded positions by, for example, the operation of solenoids so that the vanes of an actuating member upon passing the writer vane assembly are shifted to the positions in accordance with the code impressed upon the writer vane assembly.

The actuated member again includes a channel shaped member provided with riders at desired locations for causing the actuated member to ride up and over the actuating member to avoid engagement with an actuating plate on the actuating member except in the situation where the coded position of the vanes on the actuating member corresponds with the coded position of the riders on the actuated assembly. In this latter case, instead of riding over the actuating member, the actuated member is engaged by an actuating plate on the actuating member and moved by the force of the conveyor as the actuating member moves past the location of the actuated member. In this respect, the actuated member is mounted for movement in a direction normal to the direction of movement of the conveyor for riding over the actuating member and movable in a direction parallel with the movement of the conveyor assembly for accomplishing the desired job function in accordance with the movement of the actuating member thereby.

In accordance with one aspect of the present invention, the actuating member is rigidly secured to the conveying member and is installed on the conveying member before the conveying member is installed in place.

In accordance with still another aspect of the present invention the actuating members are provided on article containers which are designed for location on the conveying assembly at any of a number of desired locations. In this manner, a conventional conveyor assembly can be provided with one or any number of actuating members simply by properly locating the article containers on the conveyor.

As an example of the utilization of the present invention the method and apparatus in accordance with this invention will be described as applicable to the job functions encountered in a parts warehouse wherein parts are conveyed on the conveying member and the particular problems of impressing the desired information on the actuating members to accomplish desired functions along the length of the conveyor assembly, and reading out the coded information on the actuating members at the end of the conveyor assembly or to other utilization means as desired. Naturally, the invention is useful for other conveying purposes.

Alternatively, the invention can also be utilized in instances where articles are not actually carried on the conveying member, but rather the control conveying member is divorced from the actual article on which the operation is to take place. In this embodiment of the present invention, the assembly and coded elements can be located at a position remote from the location where job functions are to be performed and can thus be economically stored and miniaturized if so desired.

Other objects and advantages of this invention will become apparent when reading the following description and referring to the accompanying drawing in which similar characters of reference represent corresponding parts in each of the several views.

In the drawings:

FIG. 4 is a perspective view of a writer assembly in accordance with the present invention for impressing coded information on the actuating members;

FIG. 5 is an elevational view illustrating an actuating member in engagement with a reading assembly for detecting the coded information impressed upon an actuating member in accordance with the present invention;

FIG. 6 is a perspective view illustrating another embodiment;

FIG. 7 is a plan view schematically illustrating another utilization of the present invention;

FIG. 8 is an enlarged side view of a portion of the structure shown in FIG. 7 taken along line 8—8 in the direction of the arrows; and FIG. 9 is a cross-sectional elevational view of a portion of the structure shown in FIG. 8 taken along line 9—9 in the direction of the arrows.

Figure 1:
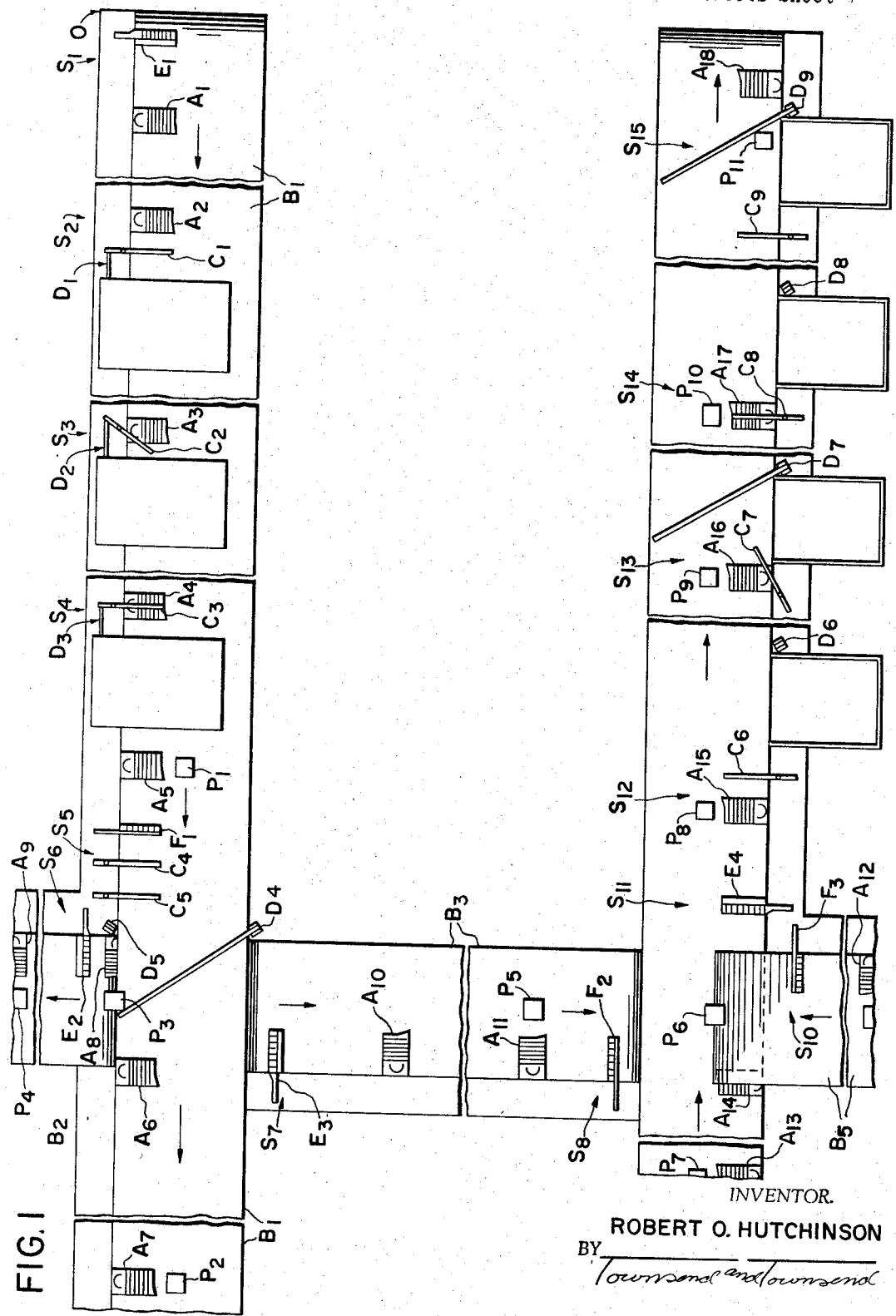
FIG. 1 is a foreshortened schematic plan view illustrating the utilization of the present invention.

Referring now to the drawings with particular reference to FIG. 1, a coded actuating member A constructed in accordance with the present invention and mounted for travel along a conveyor or conveying member B is utilized to operate an actuated member, arm or key C having information coded thereon to which the code of the actuating member A is keyed for actuation. The terms "conveyor" and "conveying member" are utilized herein and in the claims to mean the transporting member for the actuating members A whether or not the conveyor or conveying member is also designed to convey other articles. The actuated member C is associated with a particular operating mechanism D such as, for example, a lever action for opening a bin or dropping or lifting a gate for accomplishing a desired job function at particular locations along the travel path of the conveyor B. The particular coded information for each actuating member A is impressed on the actuating members A by a writer mechanism or assembly E at one location along the travel path of the conveying member B, and the coded information impressed upon an actuating member A by such a writer assembly E is detected by a reader mechanism or assembly F for passing on this information to other conveyor assemblies or for other utilization as illustrated below. The actual construction of the various members and assemblies in accordance with this invention will be described in detail below after a description of typical operation of the present invention.

While the present invention is equally applicable for the utilization of conveyor assemblies in a variety of environments and for the performance of a variety of job functions, it will be described by way of illustration with reference to employment in the automation of a parts warehouse for storing, locating, gathering and delivering specified parts called out by coded information at the parts designating station of the warehouse. Such a parts warehouse is provided with a large number of conveyors for taking parts to and bringing parts from desired store locations.

As schematically illustrated in FIG. 1, a parts warehouse utilizing a conveying method and apparatus in accordance with this invention with actuating members A, conveyors B, actuated members C, operating assemblies D, writer mechanisms E and reader mechanisms F includes a plurality of operating stations designated S for accomplishing the various functions and operations. As illustrated, in such a parts warehouse the first conveyor $B_1$ extends from an order receiving station O into the warehouse and includes a plurality of actuating members $A_{1-7}$ shown, mounted on the conveyor $B_1$ and operating stations $S_{1-5}$ illustrated.

Positioned along the illustrated length of conveyor $B_1$ are actuated members $C_{1-5}$, operating mechanisms $D_{1-5}$, and a reader mechanism $F_1$. A writer assembly $E_1$ located at station $S_1$ is mounted adjacent the moving conveyor $B_1$ for impressing onto the actuating members $A_{1-7}$ coded information corresponding to the designation of the type, location and route to a destination for particular parts which are located in the warehouse. As the conveyor $B_1$ moves forward in the direction of the arrows, this coded information is impressed upon the actuating members A which travel along with the conveyor. The coded information can be fed to the writer $E_1$ from any data processing means such as, for example, a punch card processing assembly (not shown).

At station $S_2$ coded actuating member $A_2$ is approaching an actuated member $C_1$ which is connected to an operating mechanism $D_1$ for performing a desired function. At station $S_3$ another coded actuating member $A_3$ is engaging a similarly coded actuated member $C_2$ connected to the operating mechanism $D_2$ such as a lever connected to a trap door on a parts bin for dropping onto the conveyor B parts such as a part $P_1$ illustrated adjacent $A_5$ on conveyor $B_1$. Typically, parts are packaged in standard size containers. At station $S_4$ an actuated member $C_3$ is illustrated riding over an actuating member $A_4$ where the coded information on the actuating member $A_4$ does not correspond with the code of the actuated member $C_3$. The parts such as $P_2$ positioned adjacent actuating member $A_7$ can be conveyed on into the warerouse such as, for example, to fill parts bins located therein, or diverted onto other conveying assemblies, such as conveyors $B_2$ and $B_3$ illustrated.

For diverting parts to other conveyor assemblies such as conveyors $B_2$ and $B_3$ the reader assembly $F_1$ is located in advance of the junction of the conveyors and reads or detects the coded information impressed upon the actuating members passing thereby for transferring this coded information to writer assemblies $E_2$ and $E_3$ if a part such as $P_3$ is to be diverted onto one of these two conveyor assemblies such as $B_2$ illustrated.

To accomplish the diverting operation actuated members $C_4$ and $C_5$ are located at station $S_5$ for controlling operation of gates $D_4$ and $D_5$, respectively. As illustrated, the coded information on actuating member $A_6$ having corresponded with the coded information on actuated member $C_4$, members $C_4$ and $A_6$ engaged to operate gate $D_4$ and divert package $P_3$ onto conveyor $B_2$. Simultaneously, detected coded information picked up from actuating member $A_6$ by reader $F_1$ is transferred to writer $E_2$ on conveyor $B_2$ for writing or impressing this coded information on the next arriving actuating member $A_8$ of that conveyor so that parts such as $P_4$ located adjacent actuating member $A_9$ of conveyor $B_2$ can be passed on to a desired location in the parts plants such as to a customer bin or other parts depot not shown.

Alternatively, parts can be diverted from conveyor $B_1$ by actuated member $C_5$ and gate $D_5$ onto conveyor $B_3$ which includes writer $E_3$ at station $S_7$, actuating member $A_{10}$ shown without any part associated therewith, actuating member $A_{11}$ shown with part $P_5$ associated therewith, and reader assembly $F_2$ at station $S_8$ at the junction with another conveyor $B_4$.

Traveling on conveyor $B_4$ are parts such as $P_7$ located adjacent actuating member $A_{13}$ coming from internally of the warehouse and part $P_6$ diverted onto conveyor $B_4$ from a conveyor $B_5$ at a station $S_{10}$ including a reader assembly $F_3$. Where a part such as $P_6$ is moved onto conveyor $B_4$, the coded information corresponding with that part is writen onto an associated actuating member $A_{14}$ via a writer assembly $E_4$ at station $S_{11}$. At station $S_{12}$ a part $P_8$ is shown traveling on the conveyor adjacent an associated actuating member $A_{15}$ and approaching an actuated member $C_4$ utilized for control of parts via the lever $D_6$. Station 13 illustrates diversion of a part $P_9$ via a gate $D_7$ operated by an actuated member $C_7$ where the code of member $C_7$ has been impressed upon the actuating member $A_{16}$. Where the code of the actuating member does not correspond with the code of the actuated member, such as, for example, member $A_{17}$ and $C_8$, respectively, at station $S_{14}$, the part is not diverted into the customer bin. Station $S_{15}$ illustrates the diversion of a part $P_{11}$ from the conveyor $B_4$ into a conveyor bin via the gate $D_9$.

Instead of conveying parts into the parts plant on conveyor $B_1$ as indicated above, a separate conveying system can be utilized for this purpose.

The actual construction of the various members described above will now be illustrated in greater detail for a complete understanding of the operation of the present invention.

Figure 2:
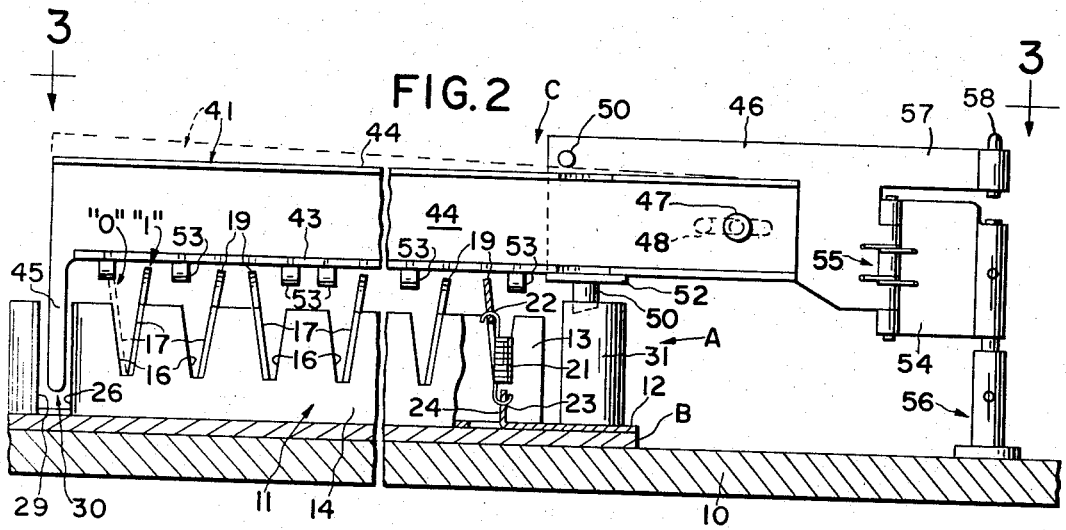
FIG. 2 is an enlarged elevational view of a conveyor assembly in accordance with the present invention illustrating an actuating member and an associated actuated member for operation of the present invention.
Figure 3:
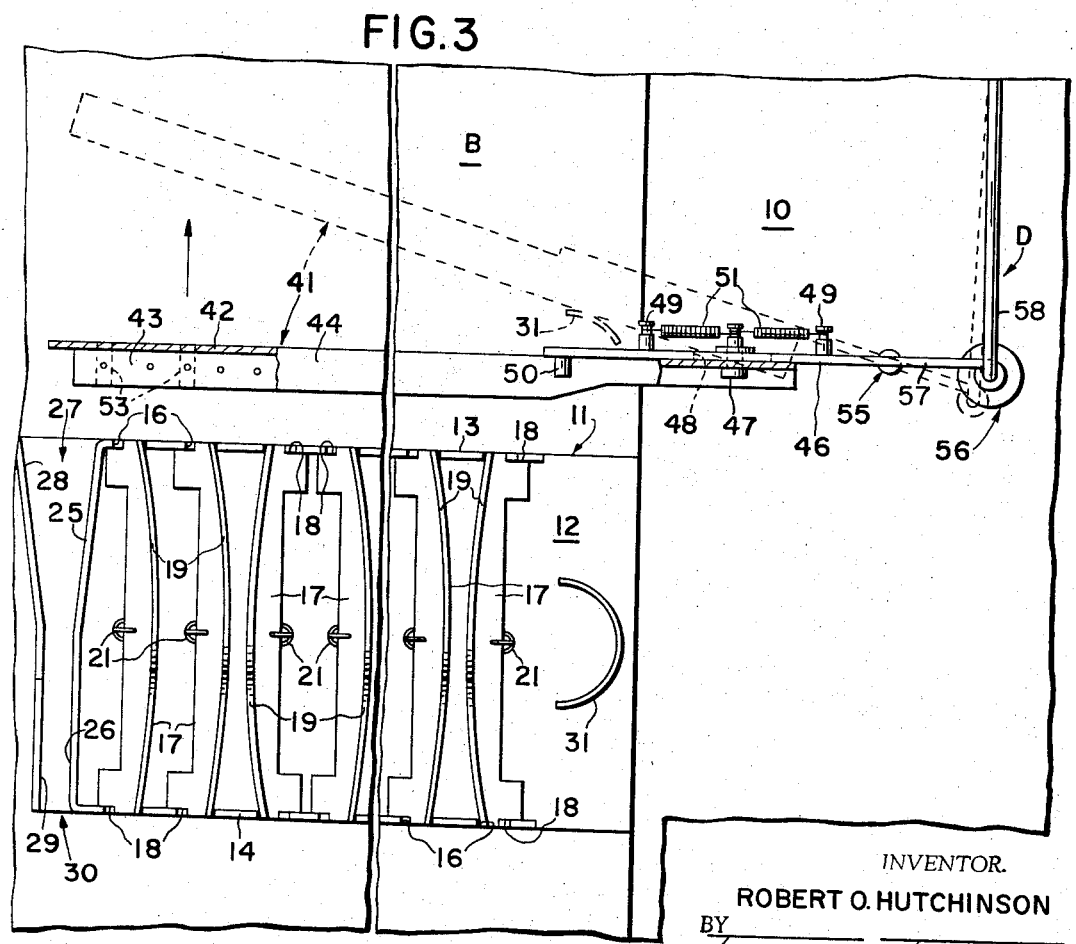
FIG. 3 is a plan view of the structure shown in FIG. 2 taken along line 3—3 in the direction of the arrows.

As illustrated in FIGS. 2 and 3 each actuating member A is formed of a channeled body 11 having a bottom 12, an upstanding leading side 13, and an upstanding trailing side 14. The body 11 is secured to the conveying member or conveyor belt B by any suitable means such as, for example, rivets (not shown) and the conveying member B is supported from a support frame 10 of any conventional design.

The sides 13 and 14 are provided with matching series of spaced apart triangular notches 15 and 16, respectively. A code vane or actuating member vane 17 notched at each of its ends as illustrated at 18 and provided with an arcuate top surface 19 is supported with the notched ends in the body side notches 15 and 16. While the notches are shown for purposes of illustration opening outward upwardly, these notches can open outward downwardly or be of any other configuration which permits the vane positioned therein to assume a plurality of positions as will be described in greater detail below. Each of the vanes 17 is resiliently held within the appropriate notches of the body 11 via a spring 21, one end of which is passed through an aperture 23 in the vane 17 and the other end of which is passed through an aperture in an upwardly punched detent 23 in the body bottom 12.

At the outer end of the channeled body 11 the sides 13 and 14 are cut away from the bottom 12 and folded to form side portions 25 and 26 of a locating channel 27 for properly locating the actuated member C with respect to the actuating member A. The other side of the locating channel is formed by an angularly upwardly folded portion 28 at the outer end of bottom 12 with a cut plate section 29 at the trailing side of the body 11 cut from the folded portion 28 to define a narrow confining portion 30 at the trailing end of the locating channel 27. At the opposite end of the body 11 from the locating channel 27 an engagement actuating plate 31 is secured to the body, projecting above the top edges of the body sides 13 and 14 but below the arcuate top surface 19 of the vanes 17.

The structure illustrated in the illustrative example and shown in FIG. 2 includes two positions for the vanes 17 for utilization of a binary code, the positions of each vane being designated as "0" and "1" and each position constituting a bit of information. Naturally, the number of vanes depends upon the magnitude of the information required to be transported on each actuating member. Typically, the code employed upon the actuating member A includes information as to route into the parts plant, the particular part and location, route out of the parts plant and destination at the receiving station for the parts warehouse example of the utilization of this invention. Each of the members, such as the actuated members C, need only include a portion of this coded information. Obviously, other code systems can be utilized wherein more than two code positions of the vane are required in which case the locating notches 15 and 16 will take a different configuration.

The actuated key or member C is made up of an upturned channeled body 41 formed of a vertically oriented channel bottom 42 and lower and upper body sides 43 and 44, respectively. One end of the channeled body 41 is provided with a downwardly depending locating arm 45 adapted for engagement in the locating channel 27 of the actuating members A to properly position the actuated member C with respect to the actuating members A during movement of the conveyor B. The other end of the body 41 is slidably supported on a bracket member 46 via a pin 47 passing through an aperture in the body bottom 42 and slidable in a slot 48 in the bracket member 46. The bracket 46 is provided with a pair of studs 49 located on opposite sides of the slot 48 and provided with spring members 51 extending to the pin 47 tending to center the pin 47 in the middle of the slot 48. The bracket 46 is also provided with a lower outwardly extending flange portion 51 adjacent its outermost end which supports the channeled body 41 but permits the body to slide back and forth with the pin 47 in slot 46 in response to movement caused by the locating arm 45 centering itself in the narrow confining portion 30 of the locating channel 27 on the actuating member A. With the actuated body 41 supported by pin 47 and bracket 52, the body 41 is free to rotate about the pin 47 from a horizontal position as shown in solid in FIG. 2 through an upwardly extending arc as illustrated in phantom in FIG. 2.

An engaging pin 50 projects from the lower surface of the flange 52 for engagement with the engagement actuating plate 31 on the actuating member A when the code of the actuating member A corresponds with that of the actuated member C as described in greater detail below.

The bracket member 46 is rotatably supported on a mounting plate 54 by a spring hinge 55 which permits rotation about a vertical axis normal to the plane of the conveyor B. The spring of the hinge 55 permits the body 41 of the actuated member C to swing from a position extending normally across the conveyor B as illustrated in solid in FIG. 3 through an arc following the direction of travel of the conveyor B as illustrated in phantom in FIG. 3.

Mounting plate 54 is supported from the main support frame 10 by a pedestal 56, and a bracket extension 57 extending from the bracket member 46 past the spring hinge 55 is connected to an operating rod 58 so that rotation of the bracket member 46 about the spring hinge 55 effectuates movement of the operating rod 58 which is part of the operating mechanism D and can be connected, for example, to the gate or trap door (not shown) of a parts bin.

Between the flange 52 and the locating arm 45 a plurality of riders 53, of, for example, Teflon, are supported on the lower surface of the lower body side 43 by peg portions passing through the body side 43. These riders 53 have an arcuate lower surface and the position of the riders is selected in a coded manner to designate the particular actuated member. With a position for riders 53 at each of the possible positions "0" and "1" for each of the vanes 17 of the actuating members A passing by the actuated member C the code designation of the particular actuated member C is accomplished by removing desired riders 53. When an actuating member such as the actuating member A shown in FIG. 2 has its vane 17 arranged to correspond to the removed riders or to the vacant rider spaces as shown, the remaining riders 53 on the actuated member C pass between the vanes 17 on the actuating member A, and the engaging pin 50 contacts the engagement actuating plate 31 so that as the conveyor B continues to move the actuated member C is rotated about the spring hinge 55 as illustrated in phantom in FIG. 3 to move the operating rod 57. However, when one or more of the vanes 17 are aligned with a rider 53 such as the vane shown in phantom in the "0" position in FIG. 2, the lower arcuate surface of the rider member 53 and upper arcuate surface of vane 17 engage to cause the channel body 41 to rotate about the pin 47 and thereby ride over the actuating member A as it moves past the actuated member C.

It will be appreciated that in all cases where the code of the actuating member A does not correspond with the code of the actuated member C, the actuated member rides over the actuating member without producing actuation of the operating mechanism D connected to the actuated member C.

The writer assembly E is positioned at one location along the conveyor for impressing coded information onto the actuating members passing thereby. Typically, the location for the writer assembly E is at the end of a recirculating conveyor where the actuating members A move from below the conveyor assembly to the top surface thereof and at which location articles are preferably fed onto the conveyor.

The writer assembly E illustrated in detail in FIG. 4 includes an upturned channeled body 61 having a bottom 62 positioned in a vertical plane and lower and upper body sides 63 and 64, respectively. At one end of the body 61 a downwardly depending locating arm 65 is provided for engagement in the locating channel 27 of actuating members A, and the other end of body 61 is slidably supported on the main frame 10 above the conveyor B such as, for example, by a pin and bracket assembly such as members 46–49 of the actuated assembly. However, the writer assembly is not mounted for rotation about a vertical axis but rather held over the conveyor and just permitted to slide back and forth for properly locating the arm 65 in channel 27.

The lower body side 63 is notched with a plurality of reset tabs 66 which are bent downwardly at equally spaced apart positions along the length of the channeled body 61 corresponding with one of the positions such as the position of the actuating member vanes 17 so that as the actuating member A passes beneath the writer assembly E, all vanes in the position are shifted by the angularly depending reset tabs to the "0" position for writing a desired code onto the actuating member.

A second upturned channel body 61' with a vertically disposed bottom 62' and lower and upper sides 63' and 64' is arranged back to back with channel body 61. The lower and upper sides are notched at equally spaced apart locations 67 and 68, respectively, therealong corresponding to locations of the travel of actuating member vanes 17 therebelow and in each pair of corresponding notches 67 and 68 a notched writer vane 71 is resiliently supported by a spring 72, one end of which is located in an aperture 73 in the vane 71 and the other end of which is located in an apertured detent 74 punched from the bottom wall 62' of the channeled body 61'.

A flange 75 is provided at the upper end of each of the writer vanes 71 and connected via a pin 76 to a solenoid 77 which can be operated by a signal applied thereto to shift the vane 71 from a standard position such as a position which will leave the vanes 17 passing thereby in the "0" to a position in which an actuating vane located in the "0" position and traveling beneath the writer assembly will be engaged and shifted to the position. In order to shift all of the writer vanes 71 effectively back to the "0" standard position a master reset rod 78 connected to a master reset solenoid 79 via a connecting arm 81 is slidably joined to each of the writer vanes 71 via pins 82 engaged and held in slots 83 in the vane flanges 75. The slots 83 permit the vanes 71 to be shifted from "0" standard position to the "1" position by the solenoid 76 while reset rod 78 is stationary but allow the reset rod 78 to shift all of the vanes 71 back to "0" position upon actuation of the reset solenoid 79.

The reader assembly F illustrated in detail in FIG. 5 is located at a position along the path length of the conveyor B spaced from the writer assembly E, and as illustrated in FIG. 1, is located at the end of the conveyor and before the junction of one conveyor with another. This reader assembly is designed to produce an output signal corresponding with the coded information on the actuating member A as it passes thereby. As illustrated in FIG. 5, the writing apparatus F includes an upturned channeled body 91 slidably supported on the main frame 10 from a pedestal 92 and mounting bracket 93 via the bracket flange 94 and the sliding pin 95 in much the same way as the actuated member C for the longitudinal movement of the body 91 so that a downwardly depending locating arm 96 can locate itself in the channel 27 of the actuating member A being read. Spaced along the lower side of the channeled body 91 are a plurality of microswitches 97 for contacting and riding over the actuating member vanes 17 as the actuating member A passes thereby. For each vane one microswitch is provided on the reader assembly located in a position corresponding to the position of the vanes 17. As the actuating member passes the reader assembly, the vanes 17 in the position close the microswitches 97 positioned thereabove while vanes 17 in the "0" position do not affect the microswitch 97 thereabove and to one side. The output from the microswitches 97 is connected through a read out circuit (not shown) which provides a signal corresponding to the designation of an "0" position where a microswitch 97 is not closed and a position where the microswitch 97 is closed. Typically, this reader assembly is placed at the end of the conveyor for detecting coded information on actuating members arriving at that end of the conveyor and rewriting this information via a writing assembly E on members A on other conveyors diverging from that location.

While the present invention has been described with reference to an embodiment wherein the actuating members A are fixedly secured to the conveying member or conveyor B, the actuating members A can be provided on the side surface of a container such as container 98 illustrated in FIG. 6. In this embodiment of the invention the conveyor B' is provided with guide members 99 along its sides for maintaining the desired orientation of the containers 98. Naturally, the orientation of the writer assemblies E, the actuated assemblies C and the reader assemblies F with respect to the conveyor B' are changed for operation with an actuating member A' traveling in a vertical plane instead of a horizontal plane.

As another embodiment of the present invention the coded conveying assembly in accordance with the present invention can be utilized in an environment where actuating members are not necessarily spaced apart along a conveyor to permit transport of articles on the conveyor. Such an assembly is illustrated in FIGS. 7–9 and can be utilized in an environment wherein the information carrier is preferably kept at a remote location from the conveyor where articles are transported. The illustrative example of this embodiment of the present invention as shown in FIGS. 7–9 is an airport baggage handling operation wherein the conveyor B' designed for transporting luggage such as bags designated $P_1'-P_3'$ passes a plurality of fluggage loading stations such as $S_1'-S_5'$. The conveyor B' is provided with indexing means (not shown) which are read at stations $S_1'-S_5'$ and transportation of the baggage on the conveyor for removal at positions along the conveyor and at the end of the conveyor is controlled by a conveyor assembly designated M which can be located in a room of the airport remote from the conveyor B'. This is particularly desirable where the conveyor B' is likely to travel in environmental conditions which might be deleterious to the control assembly M.

As illustrated in greater detail in FIG. 8, the control assembly M includes a conveying means 101 in the form of link chains movable in the channels 102 of a main frame 103 and driven by sprockets 104 mounted at the ends of the frame and connected to a drive motor 105.

Supported on the conveying memebers 101 and bridging the gap therebetween are actuating members 106 provided with vanes 107 constructed, supported and operable in the same manner as the vanes for the actuating members A described and illustrated above. Writer assemblies 108 are spaced along the conveying assembly 101 for each of the baggage stations $S_1'-S_5'$ for writing onto the conveying member 101 information as to the type and destination of the baggage inserted onto conveyor B' at the specific station. Similarly, spaced along the conveying member 101, and in this embodiment on the underneath side of the control assembly M as the conveying member 101 that is returning in the opposite direction from which it is on the upper side, are positioned reader assemblies 109 for picking up information regarding the baggage on the conveyor B' and conveying this information onto other conveyors (not shown) taking off from the conveyor B'. Thus, it will be realized that the control assembly can utilize the actuating members 106 as they pass along the top of the conveyor assembly as well as while they pass underneath the assembly.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A conveyor apparatus comprising, in combination, a support frame; a movable endless conveying member; means for mounting said conveyor member on said support frame for movement thereof; drive means for driving said conveyor member on said support frame; at least one actuating member mounted on said conveying member for movement therewith; and an actuated member located adjacent said conveying member operable by said actuating member upon passage of said actuating member past said actuated member; said actuating member including a channeled body, means defining a locating channel at one end of said body for locating said actuated member with respect to said body, and engagement actuating plate at the other end of said body for engaging said actuated member, each of the sides of said body between said ends including a plurality of spaced apart notches, a plurality of actuating vanes, each of said actuating vanes positioned within said body and having one end thereof located in a notch on one body side and the other end located in a notch in the other body side whereby said actuating vanes are movable between a plurality of positions in said body, and means for holding each of said actuating vanes in each of the plurality of positions when said actuating vane is moved to such position whereby each position of said actuating vane in said body defines a bit of information.

2. A conveyor apparatus comprising: a support frame; a continuous movable conveying member; means for mounting said conveying member on said support frame for continuous movement of said conveying member; a plurality of actuating members mounted on said conveying member for movement therewith, each of said actuating members provided with means to be coded with information; at least one actuated member located adjacent said conveying member, said actuated member coded with information and operable upon passage thereby of at least one of said actuating members coded with similar information, said actuated member including a channeled body, means for locating said body with reference to a particular portion of said actuating members, a plurality of rider members positioned along one side of said body in a coded arrangement corresponding to the arrangement of the coded means on an actuating member adapted to operate such actuated member, and means for mounting said actuated member adacent said conveying member for movement of said actuated body in a direction normal to the moving direction of said conveying member whereby said actuated member rides over all actuating members without the coded information of the actuated member and for rotation about an axis normal to the moving direction of said conveying member for actuation of said actuated member by an actuating member coded with the same information as said actuated member.

3. A conveyor apparatus comprising: a support frame; an endless movable conveying member; means for movably mounting said conveying member on said support frame for movement of said conveying member; means for driving said conveying member; a plurality of actuating members mounted at spaced apart locations on said conveying member for operation of responsive apparatus located adjacent said conveying member; writer means located at one position along the length of travel of said conveying member for impressing coded information on said actuating members upon passage thereby; and reader means located at another position along the length of travel of said conveying member spaced from said one position for detecting the coded information impressed upon an actuating member upon passage thereby; each of said actuating members including a channeled actuating member body, means defining a locating channel at one end of said actuating member body, an engagement actuating plate on said body for operation of said responsive apparatus, each of the sides of said actuating member body including a plurality of spaced apart notches, a plurality of actuating vanes, each of said actuating vanes positioned within said actuating member body and having one end thereof located in a notch in one body side and the other end located in a notch in the other body side whereby said actuating vanes are movable between a plurality of positions in said actuating member body, and means for holding each of said actuating vanes in each of the plurality of positions when said actuating vane is moved to such position whereby each position of said actuating vane in said actuating member body defines a bit of information; said writer means including a channeled writer body, writer locating arm means on said writer body for engagement in said locating channel defining means, one side of said channeled writer body provided with a plurality of spaced apart projecting tabs, one tab for each actuating vane of said actuating member, a plurality of writer vanes, means for mounting said writer means on said writer body movable between a plurality of positions and proecting from the same side of said writer body as said tabs, means for moving each of said writer means to a plurality of positions, each position corresponding to a desired position of said actuating vanes, and means for mounting said writer body adacent said conveying member whereby when said writer body is engaged by an actuating member said tabs first engage the actuating vanes upon passage of the actuating member past said writer member to shift all of said actuating vanes to one of said actuating vane positions and then said writer vanes engage said actuating vanes to shift position of at least certain of said actuating vanes thereby to impress upon the actuating vanes a desired code impressed upon the writer vanes.

4. A conveyor apparatus comprising, in combination, a support frame; a movable endless conveying member; means for mounting said conveying member on the support frame for movement thereof; drive means for driving said conveying member on said support frame; a plurality of actuating members spaced apart along the length of said conveying member and mounting for movement with said conveying member, each of said actuating members including a channeled actuating member body, means defining a locating channel at one end of said actuating member body, an engagement actuating plate at the other end of said actuating member body, each of the sides of said actuating member body between said ends including a plurality of spaced apart notches, a plurality of actuating vanes, each of said actuating vanes positioned within said actuating member body and having one end thereof located in a notch in one body side and the other end located in a notch in the other body side whereby said actuating vanes are movable between a plurality of positions in said actuating member body, means for holding each of said actuating vanes in each of the plurality of positions when said actuating vane is moved to such position whereby each position of said actuating vane in said actuating member body defines a bit of information; a writing member located at one position along the length of travel of said conveying member for impressing information onto actuating members passing thereby including a channeled writer body, writer locating arm means on said writer body for engagement in said locating channel defining means, one side of said channeled writer body provided with a plurality of spaced apart projecting tabs, one tab for each actuating vane of said actuating member, a plurality of writer vanes, means for mounting said writer vanes on said writer body movable between a plurality of positions and projecting from the same side of said writer body as said tabs, means for moving each of said writer vanes to a plurality of positions, each position corresponding to a desired position of said actuating vanes, and means for mounting said writer body adjacent said conveying member whereby when said writer body is engaged by an actuating member said tabs first engage the actuating vanes upon passage of the actuating member past said writer member to shift all of said actuating vanes to one of said actuating vane positions and then said writer vanes engage said actuating vanes to shift position of at least certain of said actuating vanes thereby to impress upon the actuating vanes the code impressed upon the writer vanes; an actuated member located adjacent said conveying member operable by said actuating member upon passage thereby including a channeled actuated body, actuated member locating arm means on said actuated body for engagement in said locating channel defining means, a plurality of rider members positioned along one side of said actuated body in a coded arrangement corresponding to the coded arrangement of the actuating vanes on an actuating member adapted to operate such actuated member and means for mounting said actuated member adjacent said conveying member for movement of said actuated body in a direction normal to the moving direction of said conveying member whereby said actuated member rides over all actuating members without the coded information of the actuated member and for rotation about an axis normal to the moving direction of said conveying member for actuation of said actuated member by an actuating member coded with the same information as said actuated member; and a reader member located at a position along the length of travel of said conveying member spaced from said location of said writer member including means for detecting the position of the actuating vanes of each actuating member passing thereby.

5. The conveyor apparatus in accordance with claim 4 characterized further in that said conveying member is an endless conveyor belt and said actuating members are spaced apart along the length of said conveyor belt along one edge thereof with space on said belt between adjacent actuating members for supporting and transporting articles.

References Cited

UNITED STATES PATENTS

| | | | |
|---|---|---|---|
| 2,315,075 | 3/1943 | Olson | 214—11 |
| 2,751,091 | 6/1956 | Freeman | 214—60 X |
| 2,784,851 | 3/1957 | Bretschneider | 214—11 |
| 2,803,333 | 8/1957 | Freeman | 198—38 |
| 2,812,079 | 11/1957 | Carnine et al. | 214—11 |
| 3,144,926 | 8/1964 | Edelman | 214—11 X |

FOREIGN PATENTS 632,403   11/1949   Great Britain.

GERALD M. FORLENZA, *Primary Examiner.*

F. E. WERNER, *Assistant Examiner.*